United States Patent [19]
Dooley

[11] Patent Number: 5,253,742
[45] Date of Patent: Oct. 19, 1993

[54] CONVEYOR HANGERS WITH ARTICULATED LINKAGES

[76] Inventor: Richard A. Dooley, 400 S. Westwood Ave., Toledo, Ohio 43609

[21] Appl. No.: 879,417

[22] Filed: May 7, 1992

[51] Int. Cl.$^5$ .............................................. B65G 17/32
[52] U.S. Cl. .................................. 198/680; 198/377; 198/475.1
[58] Field of Search ............... 198/678.1, 680, 687, 198/377, 465.4, 475.1, 474.1, 485.1; 105/149

[56] References Cited

U.S. PATENT DOCUMENTS

| | | | |
|---|---|---|---|
| 2,471,347 | 5/1949 | Rayburn | 198/680 |
| 2,708,999 | 5/1955 | Rush | 198/687 X |
| 2,783,962 | 3/1957 | Lyon | 198/486.1 X |
| 2,821,289 | 1/1958 | Castagnoli et al. | 198/680 |
| 2,952,351 | 9/1960 | Stone | 198/377 |
| 3,010,584 | 11/1961 | Rutkovsky et al. | 198/678.1 X |
| 3,684,078 | 8/1972 | Nielsen | 198/377 |
| 4,513,682 | 4/1984 | Otocki | 198/680 X |
| 5,000,309 | 3/1991 | Dooley | 198/680 |
| 5,038,900 | 8/1991 | Durant et al. | 198/465.4 |

FOREIGN PATENT DOCUMENTS

| | | | |
|---|---|---|---|
| 3036116 | 5/1982 | Fed. Rep. of Germany | 198/678.1 |
| 0893742 | 12/1981 | U.S.S.R. | 198/680 |
| 0899267 | 1/1982 | U.S.S.R. | 198/680 |
| 1449991 | 9/1976 | United Kingdom | 198/377 |

*Primary Examiner*—James R. Bidwell
*Attorney, Agent, or Firm*—Allen D. Gutchess, Jr.

[57] ABSTRACT

A conveyor has an overhead rail with a chain therebelow moving rollers along the conveyor rail. A first link is affixed to the conveyor chain and extends perpendicularly thereto for all portions of the conveyor rail. A second link is located below the first and carries a part-carrying rack. A universal joint connects a lower end of the upper link and an upper end of the lower link, the latter being angled to place the universal joint yokes at angles relative to one another. When the link assembly moves up or down an ascending or descending portion of the conveyor, the rack carried by the second link is caused to pivot so that the racks can be placed closer together when moving along horizontal portions of the conveyor rail.

8 Claims, 2 Drawing Sheets

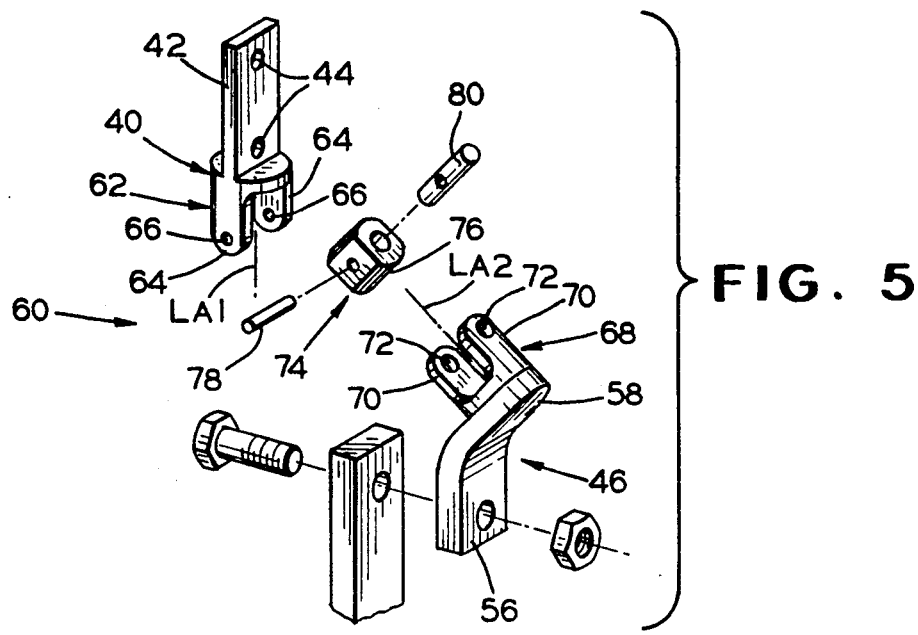
FIG. 5
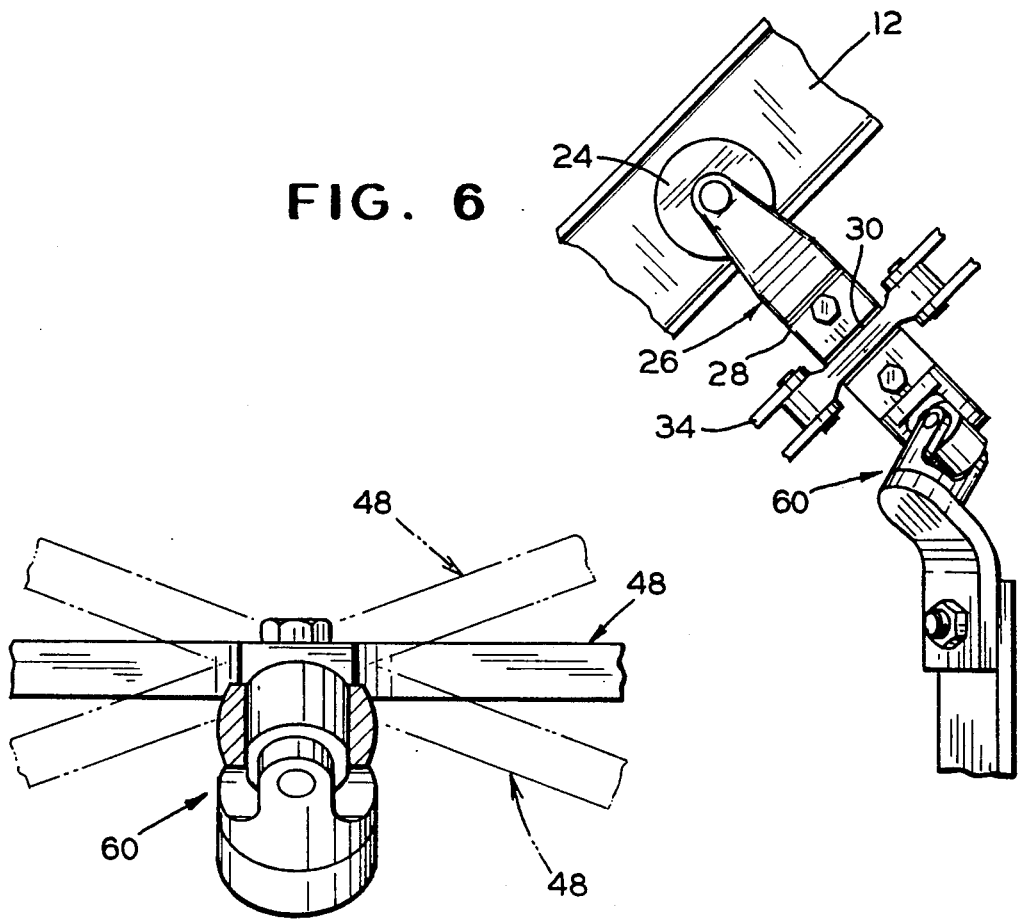
FIG. 6
FIG. 7

CONVEYOR HANGERS WITH ARTICULATED LINKAGES

This invention relates to a conveyor with part-carrying racks which are automatically moved to transverse positions when the racks move from positions below horizontal portions of the conveyor to positions below angled portions of the conveyor.

More specifically, the conveyor is of the monorail type which moves racks or frames of parts or articles supported below the rail along a predetermined path. The path typically extends through cleaning and/or painting and baking operations for the parts. Since the parts are usually cleaned or coated from both sides, the part racks must be positioned parallel to the path along which they move so that opposite surfaces of the parts can be equally treated from both sides.

In most instances, the monorail conveyors must move the parts along angular portions of the path as well as horizontal ones when the parts are moved between floors or different levels of operation. When the parts move along the angled portions of the path, the racks must not touch one another, which, of necessity, requires that the racks be spaced apart a substantial distance when on the horizontal portions of the predetermined path. Heretofore, to avoid contact of adjacent racks during forty-five degree ascending and descending portions of the path, for example, the racks typically were spaced apart on the horizontal portions of the path a distance equal to one and one-half times the rack width.

The unique conveyor design in accordance with the invention causes the part racks or frames to automatically rotate about upright axes between positions in which they are parallel to the predetermined path when the racks are below horizontal portions of a rail of the conveyor to positions in which they are transverse to the path when the racks are below angled, ascending or descending portions of the conveyor rail. The design of the conveyor can cause the racks to rotate up to about ninety degrees when moving from the horizontal to the angled portions of the predetermined path. With that degree of movement, only the thickness of the racks need be taken into account when they are at the angled portions of the predetermined path. Consequently, the racks can be almost in contact when positioned parallel to the predetermined path and below the horizontal portion of the conveyor rail. Therefore, a substantially continuous wall of parts can be presented as they pass through cleaning, painting and baking operations, for example. The throughput capacity of an existing operation including a monorail conveyor having typically forty-five degree ascending and descending portions can be increased approximately fifty percent, maintaining the same processing cycle times and changing only the feed rates of coating materials applied to parts. The new conveyor design also enables preloaded racks or frames of parts to be relatively easily hung on and removed from conveyor hangers. The conveyor design also enables the racks or frames to be more accurately positioned parallel to the direction of the predetermined path along which they move, which is important when precise spacing between the parts and spray gun nozzles, for example, is required for uniform coating or finishing.

A conveyor in accordance with the invention includes an overhead rail having at least one generally horizontal portion and one slanted or angled portion, which rail carries parts along a predetermined path, including ascending and descending portions. The overhead rail has roller chains below which the hangers extend. Rollers ride on flanges of the overhead rail and are connected by chains therebelow throughout the length of the conveyor. Part-carrying holders or racks are supported below the chains. Below pairs of rollers and below the chain is a first, upper link or bar connected to the chain and maintained in a position perpendicular to the overhead rail for all positions, whether horizontal or angled. A second, lower link or bar is connected to the part rack or holder and extends thereabove. A lower end of the first link and an upper end of the second link are connected by a universal joint, prefereably of the Cardan type.

The upper end of the lower link and the lower end of the upper link have universal joint yokes which are pivotally connected by a cross. The yokes are angled relative to one another in a manner such that under the horizontal portion of the overhead rail, the plane of the parts holder is parallel to the path of movement. However, when the links and the universal joint reach an angled portion of the conveyor, with the first link remaining perpendicular to the conveyor rail, the second universal joint yoke and the second link and rack carried thereby are turned angularly relative to the lonitudinal path of movement of the racks so that the racks can be placed much closer together on the horizontal portion of the conveyor and still clear one another on the angled portions of the conveyor.

It is, therefore, a principal object of the invention to provide a conveyor for racks of parts which are turned transversely to their path of movement when the racks are carried along angled paths of the conveyor, without requiring auxiliary or special components to accomplish this.

Many other objects and advantages of the invention will be apparent from the following detailed description of a preferred embodiment thereof, reference being made to the accompanying drawings, in which:

FIG. 5 is an exploded view in perspective of links and a universal joint connecting same shown in FIGS. 3 and 4;

FIG. 6 is a fragmentary view similar to FIG. 4 with certain components of the conveyor shown on an angled portion; and FIG. 7 is a somewhat schematic view taken along the lines 7—7 of FIG. 4, with a parts rack shown in different angular positions.

Figure 1:
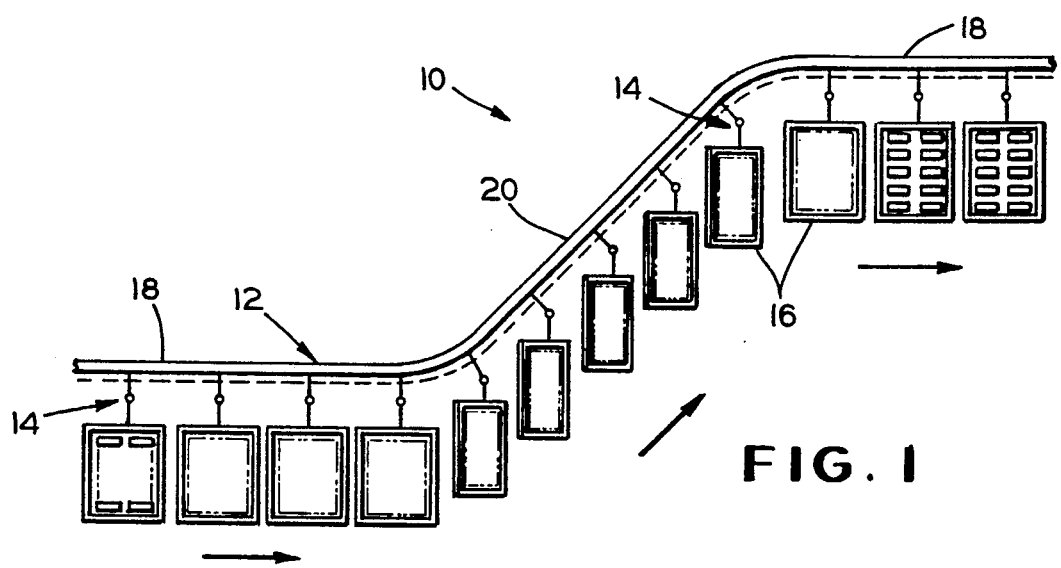
FIG. 1 is a schematic view in elevation of a conveyor in accordance with the invention.
Figure 2:
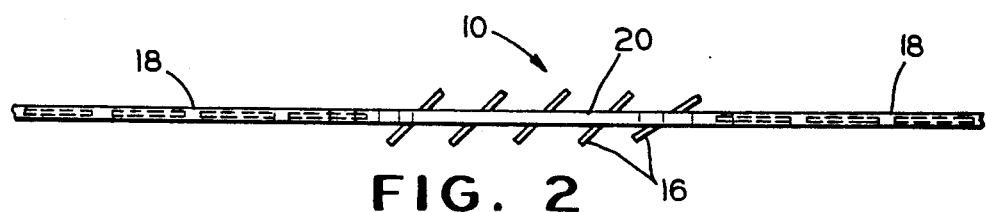
FIG. 2 is a schematic plan view of the conveyor of FIG. 1.

Referring to FIGS. 1 and 2, a conveyor embodying the invention is indicated at 10 and includes an overhead monorail 12 and support assemblies 14 for carrying racks or frames 16 for parts or articles. The rail 12 has horizontal portions 18 and angled portions 20, one being shown. Operations on the parts, such as cleaning, coating, and baking, are usually performed along the horizontal portions 18 of the monorail 12 and the parts and racks 16 are moved between different levels or floors along the angled portions 20. The racks 16 must be parallel and coplanar to their movement along a predetermined path, as determined by the monorail 12, when they are on the horizontal portions 18 thereof. In this manner, the parts can be sprayed, etc. equally from both sides. Heretofore, the racks 16 had to be spaced apart a sufficient distance that the edges did not contact one another when they were on the angled portion of the conveyor. However, when the racks are turned transversely on the angled portion 20, they can be virtually in contact when on the horizontal portions 18. This close spacing has a number of advantages as discussed previously.

The racks 16 are turned automatically to the transverse positions when on the angled portion 20 by the design of the support assemblies 14. The overhead monorail 12 has lower flanges 22 on which are rotatably supported rollers 24. These are rotatably connected to ends of trolley components 26 which extend downwardly to lower tangs 28. the tangs are connected to move together by chain links 30 which are received in notches 32 of the tangs and are pivotally connected to other chain links 34. The yoke tangs are connected by suitable fasteners such as bolts 36 and nuts 38.

A first, upper link or bar 40 has an upwardly extending tang 42 with openings 44 (FIG. 5) received between the yoke tangs 28 and held rigidly by the bolts 36. A second, lower link or bar 46 is connected to an upper bar 48 of the rack or frame 16, specifically by an upper tongue 50 of the rack. A bolt 52 and a nut 54 or other suitable fasteners can connect the rack tongue 50 to a lower portion 56 of the lower link 46, the link 46 having any angular upper portion 58.

The lower end of the upper link 40 and the upper end, specifically the angled portion 58, of the lower link 46 are pivotally and swivably connected by a universal joint 60, preferably a Cardan universal joint. The universal joint 60 includes an upper universal joint yoke 62 which is functionally integral with the lower end of the upper link 40 and has arms 64 with holes or bores 66 (FIG. 5). The universal joint 60 also includes a lower, angular yoke 68 which is functionally integral with the upper angular portion 58 of the lower link 46 and has arms 70 with bores 72.

The yokes 62 and 68 are connected by a universal joint cross 74 which is shown in a simplified form as a cross body 76 having pins 78 and 80 affixed therein and extending therefrom to serve as trunnions to be received in the yoke arm bores 66 and 72.

An axis taken through the first yoke arm bores 66 of the yoke arms 64 is always parallel to the direction of movement and the position of the monorail 12 immediately thereabove whether on the horizontal portion, angled portion, or portions therebetween. Likewise, an axis taken through the bores 72 of the yoke arms 70 is always perpendicular to the axis through the bores 66 and also always lie in a plane perpendicular to the direction of movement of the conveyor on the monorail. However, as the conveyor chain moves up the angled portion 20 of the conveyor, action of gravity causes the second link 46 and the yoke 68 to pivot around the pin 80 of the cross 74 such as to a position shown in FIG. 6. This causes the angular movement of the lower link 46 and, likewise, the angular movement of the racks or frames 16 to the positions shown in FIGS. 1 and 2.

Figures 3, 4:
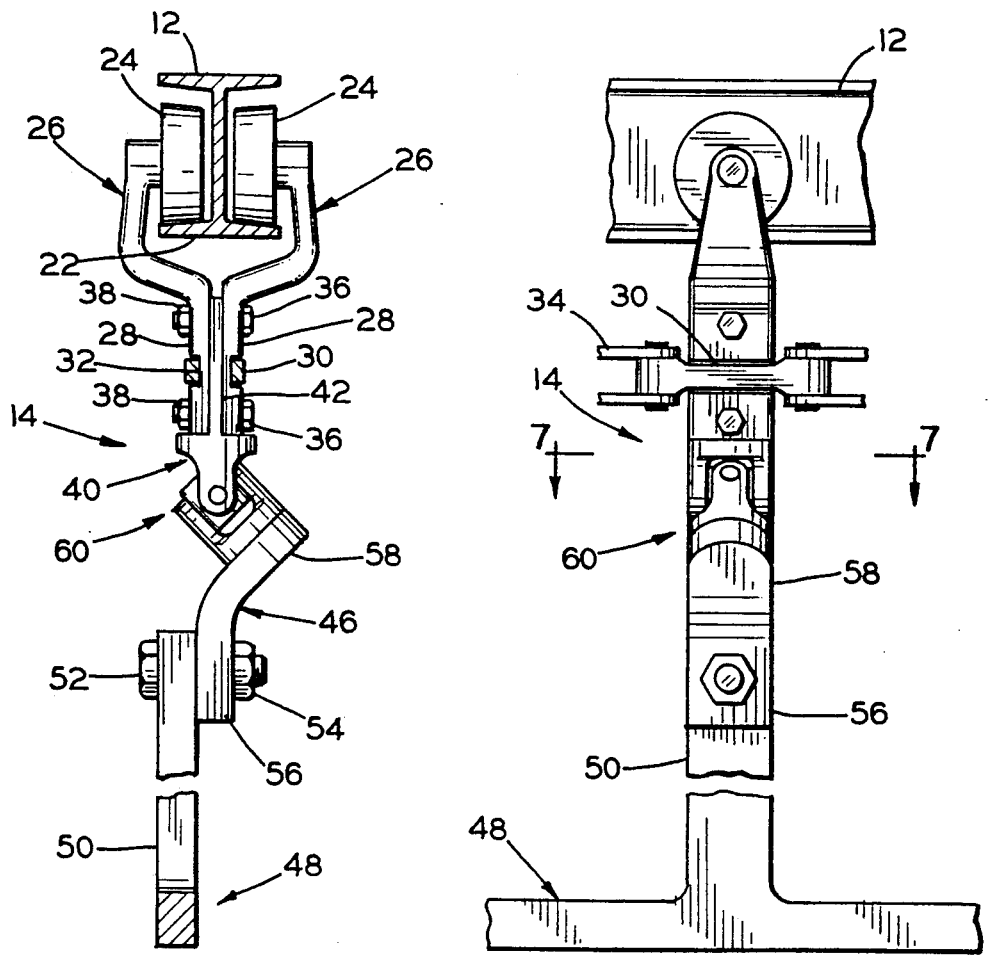
FIG. 3 is a transverse view in elevation of conveyor components shown in FIGS. 1 and 2.
FIG. 4 is a side view in elevation of the components shown in FIG. 3.

A longitudinal axis LA 1 (FIG. 5) taken centrally through the yoke 52 parallel to the yoke arms 64 is always perpendicular to the monorail 12. A longitudinal axis LA 2 taken centrally through the yoke 68 parallel to the yoke arms 70 intersects the longitudinal axis of the yoke 52 at a predetermined angle when the support assembly 14 is below the horizontal portion 18 of the monorail, as shown in FIG. 3 for example. The predetermined angle can be changed by changing the angular upper portion 58 of the lower link 46 relative to the lower portion 56 of that link. This angle can be allowed according to the extent of the slope of the angled portion 20 of the conveyor as well as to the extent of pivotal or transverse movement desired for the parts racks 16.

If the angle of ascent or descent of the angled portion 20 of the monorail 12 is known and the desired transverse position of the rack 16 below the angled portion 20 is known, the predetermined angular relationship of the yokes can be determined algebraically or geometrically. The angular relationship is similar to that disclosed in my U.S. Pat. No. 5,000,309, issued Mar. 19, 1991.

Various modifications of the above-described embodiment of the invention will be apparent to those skilled in the art, and it is to be understood that such modifications can be made without departing from the scope of the invention, if they are within the spirit and the tenor of the accompanying claims.

I claim:

1. A conveyor comprising an overhead conveyor rail having a generally horizontal portion and an angled portion which is angularly disposed to a horizontal plane, chain means movably carried below said rail, hanger means supported by said rail and movable therealong by said chain means, said hanger means comprising an upper link carried by said rail and movable by said chain means with said chain means maintaining said upper link in a position perpendicular to said rail, a lower link, connecting means connecting an upper end of said lower link to a lower end of said upper link, said connecting means being a universal joint positioned at an angle relative to said links whereby said lower link rotates about a generally vertical axis when said hanger means is moved below the angled portion of said conveyor rail.

2. A conveyor according to claim 1 wherein said universal joint is of the Cardan type.

3. A conveyor according to claim 2 wherein said universal joint has a downwardly extending yoke affixed to the lower end of said upper link and an angularly extending yoke affixed to the upper end of said lower link, and a cross connecting said yokes.

4. A conveyor according to claim 3 wherein said upper end of said lower link extends at an angle to the vertical and said angularly-extending yoke extends perpendicularly from said upper end.

5. Hanger means for supporting a parts rack below an overhead conveyor rail, said hanger means comprising an upper link supported by said conveyor rail and being maintained in a position perpendicular to said conveyor rail by chain means movable along said conveyor rail, a lower link being connected by connecting means to said upper link and positioned substantially vertically for all positions under the conveyor rail, said connecting means being a universal joint connected to a lower end of said upper link and to an upper end of said lower link, with said lower link being angled in a manner to cause said lower link to pivot while remaining substantially vertical for any angular position of said overhead conveyor rail, said universal joint being of the Cardan type, and said universal joint having a downwardly-extending yoke affixed to the lower end of said upper link and an angularly-extending yoke affixed to the upper end of said lower link, and a cross connecting said yokes.

6. Hanger means for supporting a parts rack below an overhead rail having a generally horizontal portion and an angled portion, said hanger means comprising an upper link supported by said conveyor rail and being maintained in a position perpendicular to said conveyor rail, a lower link, said upper link having a first universal joint yoke at its lower end, said lower link having a second universal joint yoke at its upper end and having a central longitudinal axis intersecting a central longitudinal axis of said first yoke at a predetermined angle when said hanger means is below a horizontal portion of said conveyor rail, and a cross pivotally connecting said yokes, said lower link pivoting when said hanger means is below an angled portion of the overhead conveyor rail to move the parts rack carried thereby to a transverse position relative to said overhead rail.

7. Hanger means according to claim 6 wherein said upper end of said lower link extends at an angle to the vertical and said second universal joint yoke extends perpendicularly from said angled upper end.

8. Hanger means according to claim 6 wherein said cross has a central body with pins extending therethrough and received in bores in said yoke arms.

* * * * *